United States Patent [19]
Ackley et al.

[11] Patent Number: 5,170,448
[45] Date of Patent: Dec. 8, 1992

[54] OPTICAL WAVEGUIDE APPARATUS AND METHOD FOR PARTIALLY COLLECTING LIGHT

[75] Inventors: Donald E. Ackley, Phoenix; Michael S. Lebby, Chandler, both of Ariz.

[73] Assignee: Motorola, Inc., Schaumburg, Ill.

[21] Appl. No.: 817,224

[22] Filed: Jan. 6, 1992

[51] Int. Cl.⁵ .............................................. G02B 6/10
[52] U.S. Cl. ....................................... 385/31; 385/14; 385/44; 385/47; 385/131; 385/132
[58] Field of Search ....................... 385/14, 47, 31, 44, 385/39, 129, 130, 131, 132; 250/227.11; 264/1.1, 1.4, 1.5, 1.7, 2.2, 2.7

[56] References Cited
U.S. PATENT DOCUMENTS

| | | | |
|---|---|---|---|
| 4,776,660 | 10/1988 | Mahlein et al. | 385/44 X |
| 4,966,430 | 10/1990 | Weidel | 385/14 |
| 4,969,712 | 11/1990 | Westwood et al. | 385/14 |
| 5,046,800 | 9/1991 | Blyler, Jr. et al. | 385/131 |
| 5,093,890 | 3/1992 | Bregman et al. | 385/146 |
| 5,119,451 | 6/1992 | Wills et al. | 385/14 |
| 5,123,078 | 6/1992 | Thomas | 385/130 |
| 5,125,054 | 6/1992 | Ackley et al. | 385/14 X |

*Primary Examiner*—Brian Healy
*Attorney, Agent, or Firm*—Joe E. Barbee

[57] ABSTRACT

A method is provided for partially collecting light from a polymer waveguide (11, 56). A polymer waveguide (11, 56) is provided, through which a light signal (17) is traveling. A faceted groove (28) is placed in the polymer waveguide (11, 56), thereby reflecting a controllable portion of the light (22) that is traveling through the polymer waveguide (11, 56) from the facet (21) at an oblique angle. Typically, the reflected light is directed into a photodetector (24, 41), which is included into an integrated circuit (52, 53) on a substrate (51).

11 Claims, 2 Drawing Sheets

OPTICAL WAVEGUIDE APPARATUS AND METHOD FOR PARTIALLY COLLECTING LIGHT

BACKGROUND OF THE INVENTION

This invention relates, in general, to optical devices and, more particularly, to optical waveguides.

At present, optical signals are transmitted through interconnections called waveguides. Typically, these waveguides interconnect photonic devices, such as light emitters and light detectors.

Conventionally, optical signals or light beams in polymer waveguides are split or directed into parts by beam splitting or Y-branching components.

Typically, beam splitting requires completely sectioning or terminating a first waveguide at an angle. A partially reflective surface or mirror is positioned at the angle of the terminated end of the first waveguide. Subsequently, a second waveguide is positioned at the partially reflective mirror. A light signal passing through the first waveguide encounters the partially reflective mirror and reflects part of the light signal at an oblique angle, while another part is passed through the partially reflective mirror into the second waveguide. However, fabrication of beam splitters in this manner presents several problems, such as complexity of fabrication, cost of fabrication, and inherent losses in light signals meeting interfaces Y-branching of optical signals is achieved by dividing a single waveguide into two parts in a form of a Y. However, use of Y-branching has several problems, such as requiring a large footprint or a large area to construct and poor control of splitting a specific amount or portion of the optical signal or light. These problems makes Y-branching inappropriate as an inexpensive and manufacturable method for splitting light.

U.S. Pat. No. 4,772,787 by Trommer et al. and U.S. Pat. No. 4,756,590 by Forrest et al. both teach methods of total reflection of light traveling through a waveguide composed of III-V materials or an optical fiber respectively. Neither Trommer et al. nor Forrest et al. solve the problem of partial diversion or partial collection of light from a polymer waveguide. Additionally, it is known in the art that scratching or nicking optical fibers enables light to escape from the scratch or nick; however, scratching or nicking the optical fiber can break the optical fiber, thereby not providing a solution to enable light to be coupled out of the optical fiber in a controlled manner.

It can be readily seen that conventional light-signal splitting methods in waveguides have severe limitations in reliable fabrication. Additionally, it is also evident that manufacturing complexity and efficiency of light-signal coupling are also limited. Therefore, a method for making an optical partial collector simply, effectively, and with greater efficiency would be highly desirable.

SUMMARY OF THE INVENTION

Briefly stated, according to the invention, a method is provided for partially collecting or tapping light from a polymer waveguide. A polymer waveguide is provided, wherein a light signal is traveling through the polymer waveguide. A faceted groove is placed in the polymer waveguide, thereby reflecting a portion of the light from the polymer waveguide by the facet at an oblique angle.

DETAILED DESCRIPTION OF THE DRAWINGS

Figure 1:
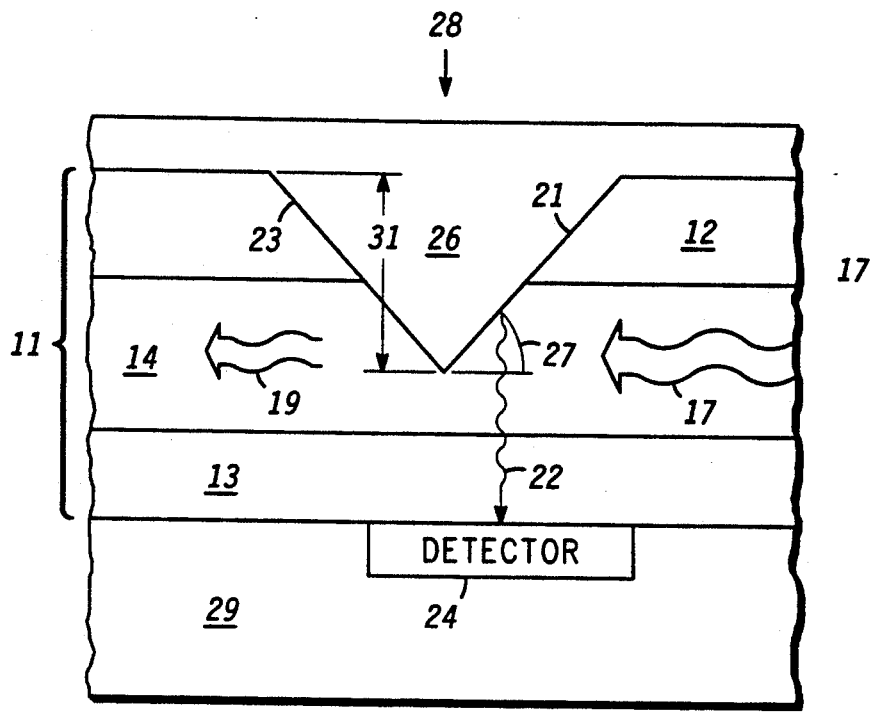
FIG. 1 illustrates a simplified cross-sectional view of a of a portion of a polymer waveguide with an embodiment of the present invention.

FIG. 1 illustrates a simplified cross-sectional view of an embodiment of the present invention of a partial collector 10 in an optical polymer waveguide 11 on a substrate 29.

Conventionally, core layer or region 14 and cladding layers or regions 12 and 13 are made of an optically transparent polymer material, such as polyimides or plastics that are applied on substrate 29. Selection of the polymer or plastic materials for core region 14 and cladding regions 12 and 13 typically is dependent upon several factors, optical transparency of the polymer material at a desired wavelength of light, ease of use of the polymer material selected, and a distance required to transport the light signal.

In addition, refractive index differences between core region 14 and cladding regions 12 and 13 are used to improve performance of polymer waveguide 11. Typically, the refractive index of core 14 is higher than cladding regions 12 and 13, thereby improving performance parameters, such as improved guiding, reduced absorption of the light, or the like. Also, it should be understood that in some specific applications cladding regions 12 and 13 are made of a variety of materials; however, the materials will still retain a lower refractive index than core 14. As is practiced in the prior art, a partial diversion or collection of light from polymer waveguide 11 is achieved either by Y-branching of waveguide 11 or by beam splitting of waveguide 11; however, neither of these alternatives solves problems, such as cost, complexity of manufacturing, and inherent losses of traveling through interfaces.

In the present invention, a facet 21 is made in a polymer waveguide 11, thereby providing an easy, inexpensive, and more efficient method of collecting light from polymer waveguide 11. Typically, a portion of waveguide 11 is partially removed in such a manner that at least a plane or a facet 21 is formed with an angle 27 in waveguide 11. Angle 27 typically ranges from 25 degrees to 65 degrees from perpendicular to core 14. In a preferred embodiment of the present invention, angle 27 is set at 45 degrees from perpendicular to core 14. Facet or plane 21 is a flat surface, which extends across waveguide 11, and intersects light signal represented by arrow 17, traveling through waveguide 11; however, it is not necessary to completely extend plane or facet 21 across waveguide 11 in its entirety. In a preferred embodiment of the present invention, removal of material from waveguide 11 typically is shaped into a faceted groove or a V-groove 28 which partially bisects or intersects waveguide 11; however, other cross-sectional shapes may also be formed in waveguide 11, such as a rectangle or a triangle. As a result of forming V-groove 28 in polymer waveguide 11, plane or facet 23 is made in addition to facet 21. Also, V-groove 28 is made to a predetermined depth 31 in waveguide 11, thereby varying an amount of light reflected off of facet 21. Additionally, depending upon specific applications, other shapes, such as three dimensional forms, are made in polymer waveguide 11, for example, a cone, a tetrahedron, or a diamond.

Generally, in the present invention, light signal 17 propagates through waveguide 11 in either a single mode form or a multimode form. However, for the sake of simplicity, arrow 17 illustrates the light signal that is traveling or propagating through waveguide 11 regardless of form. As light signal 17 propagates through waveguide 11, a portion or fraction of light signal 17 strikes reflective plane of facet 21, thereby reflecting at least a portion or a fraction of light signal 17 at an oblique angle from normal represented by arrow 22 toward detector 24. Additionally, it should be understood that light signal represented by arrow 17 propagates in either a single mode propagation form or a multimode propagation form. For illustrative purposes only, the multi-mode propagation form will be discussed hereinafter.

Reflectivity of facet 21 is dependent upon several factors, such as a change in refractive index from waveguide 11 to a material just behind facet 21 and depth of facet 21. Accordingly, by selecting a material, such as polymers, glasses, or silicones with a lower refractive index to fill the region behind facet 21, a variable amount of light is reflected off of facet 21. Typically, the region behind facet 21 is a lower refractive index than waveguide 11, thereby reflecting at least a portion of light signal 17 toward detector 24. For example, with core region 14 having a refractive index of 1.5 and with the region behind facet 21 being air with a refractive index of 1.0, a large fraction of light signal 17 is directed or reflected toward detector 24. However, in a preferred embodiment of the present invention, the region behind facet 21 is filled with a polymer that has a lower refractive index than core region 14 or cladding regions 12 and 13. By carefully selecting polymer materials to fill V-groove 28, a partial reflector is made, thus allowing some of light signal 17 to continue to propagate as light signal 19, while some of light signal 17 is directed to detector 24. Typically, backfilling of the region behind facet 21 is achieved by applying a polymer layer 26 to V-groove 28 and cladding region 12. In addition, replacing polymer layer 26 with a highly reflective material such as aluminum makes a total reflective facet, thereby directing all of light signal 17 to detector 24.

By way of example, substrate 29 is a commercially available printed circuit or multi-chip module with detector 24 integrated into an integrated circuit. Polymer materials that make cladding layers 12 and 13 also are commercially available as either a liquid such as polyimide or as a plastic sheet such as acrylate photopolymerizable monomer, which is available as either a liquid or a solid. Liquid cladding materials are spun onto substrate 29, and plastic sheet cladding materials are laminated onto substrate 29. In a preferred embodiment of the present invention, materials for cladding regions 12 and 13 are chosen with the refractive index ranging from 1.2 to 1.8, with a preferred refractive index at 1.4.

In a preferred embodiment of the present invention, core region 14 is made of a photosensitive polymer layer that is applied over cladding region 13. The photosensitive polymer is applied as a liquid that uses a spin-on method for application. Routing or defining of waveguides on cladding region 13 is achieved through well-known photolithography methods. The photolithographic methods expose or illuminate certain portions or areas of the photosensitive polymer, while other portions or areas are not illuminated. In the areas that are illuminated, a refractive index change occurs in the photosensitive polymer creating core 14, whereas in the nonilluminated areas no change occurs; thus, defining cladding regions on either side of core 14. A heat cycle typically is used to drive the refractive index change to completion, thereby achieving a stable core region 14. Refractive index of core 14 ranges from 1.2 to 1.8 with a preferred refractive index of 1.6. Additionally, in a preferred embodiment of the present invention, refractive indexes of cladding regions 12 and 13 are matched to the nonilluminated areas of photosensitive polymer, thereby creating cladding that surrounds core 14. Once core region 14 is defined and the appropriate process is completed, cladding region 13 is applied over core region 14. Processes for application of cladding region 13 are similar to the processes used to apply cladding region 12 and have been discussed hereinbefore. It should be understood that matching the refractive indexes of the unexposed areas on either side of core region 14 with cladding regions 12 and 13 increases performance parameters, such as decreasing light signal scattering and increasing useful length of waveguide 11.

In a preferred embodiment of the present invention, facet 21 is made by V-groove 28 in waveguide 11. Depth of facet 21 typically ranges between 5 percent to 95 percent of the height of waveguide 11, thereby allowing selection of different amounts of light to be reflected from facet 1. In a preferred embodiment, depth of facet 21 is 25 percent of waveguide 11. However, it should be understood that depth of facet 21 varies in accordance with several factors, such as specific application, mode variables of the light signal, and reflectivity of facet 21.

Typically, V-groove 28 is made by several well-known methods, such as stamping, laser ablating, or routing or cutting V-groove 28 out of waveguide 11. In a preferred embodiment, V-groove 28 is made by a heat assisted stamping method, thereby achieving a very inexpensive and manufacturable method of providing facet 21. However, as waveguide 11 becomes smaller, laser ablation to create facet 21 would become more useful.

Backfilling of V-groove 28 with polymer 26 having a refractive index lower than core region 14 is achieved by well-known methods in the art, thus allowing control of the fraction or the portion of light reflected out of waveguide 11. Typically, refractive index of polymer 26 ranges from 1.2 to 1.8 with a preferred refractive index of 1.5.

Figure 2:
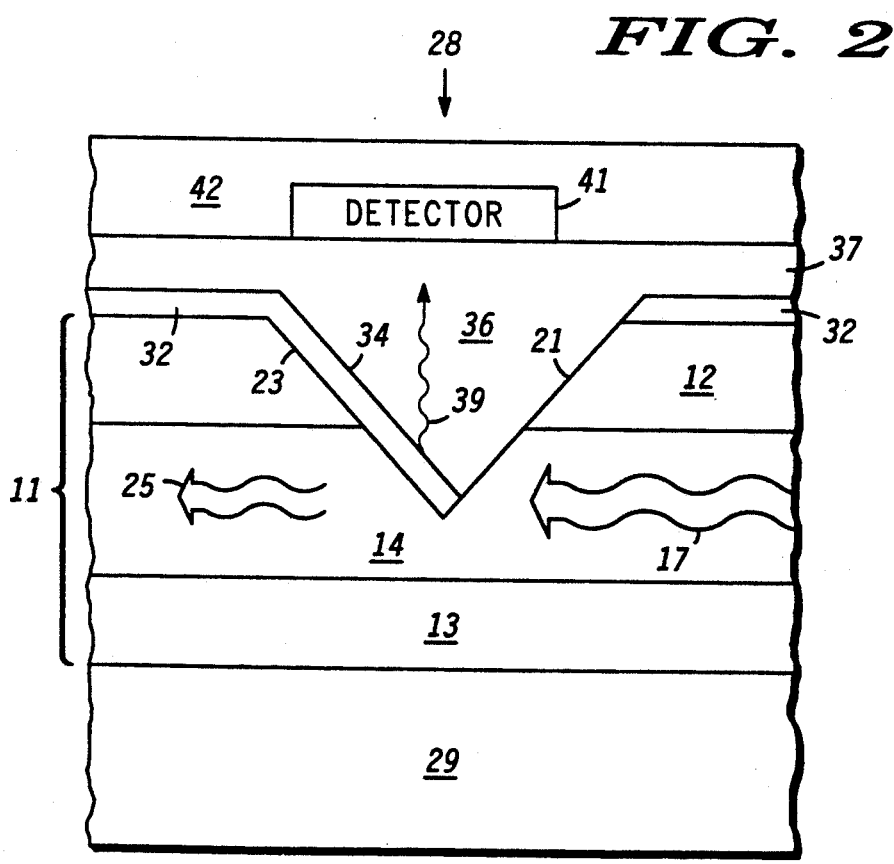
FIG. 2 illustrates a simplified cross-sectional view of a portion of a polymer waveguide with another embodiment of the present invention.

FIG. 2 illustrates a simplified cross-sectional view of another embodiment of the present invention. Generally, cladding regions 12 and 13, core 14, V-groove 28 are created as described in FIG. 1.

In this embodiment of the present invention, substrate 31 is used to support cladding region 13. It should be understood that substrate 31 is possibly any number of substrates, such as a multi-chip module, a printed circuit board, a silicon wafer. Once V-groove is formed providing facets 21 and 23, a highly reflective mirror is made on facet 23 of waveguide 11.

Typically, highly reflective material is made of several different materials, such as aluminum, silicon, nitrides, silicon organic glasses, and silicon dioxides. Additionally, combinations of the above mentioned materials are used to adjust reflectivity of the highly reflective material. For example, application of highly reflective material 32 made of aluminum is achieved by tilting substrate 31 to expose facet 23 and depositing the highly reflective material by a directional deposition system, such as an e-beam evaporation system. Since deposition of highly reflective material is accomplished by a directional system, facet 21 is kept relatively clean thus allowing light to pass through facet 21 toward reflective material 32 on facet 23. By deposition of highly reflective material 32 on facet 23, a light reflecting or mirror surface 34 is created. Additionally, during the deposition of highly reflective material 32 a layer is also deposited on cladding region 12. However, it should be understood that layer 32 is capable of being removed, if it is desired, by several conventional methods, such as lift-off or selective etching methods. It should be further understood that the presence of layer 32 does not affect the transmission or propagation of light signal 17. Further, deposition procedures of highly reflective material 32 varies depending upon the material used. Region 36 in V-groove 28 typically is backfilled with a polymer material, thereby creating layer 37, which fills the cavity created by V-groove 28. Layer 37 is made with a refractive index that is equal to core region 14, thus guiding reflected light 39 towards detector 41, mounted in substrate 42.

Generally, light signal represented by arrow 17 propagates through waveguide 11 in a normal fashion as discussed hereinbefore. Light signal 17 is transmitted through facet 21, which now preferentially directs the light signal toward facet 23 which is covered with mirror 34. Facet 21 transmits or directs light toward mirror 34 because region 36 behind facet 21 is filled with material 37 having with a refractive index that is approximately equal to waveguide 11. Light signal 17 is reflected off mirror 34 at an oblique angle, which is represented by arrow 39. In a preferred embodiment of the present invention, light signal 17 is reflected off mirror 34 and passes through region 36, that is backfilled with a polymer 37 having a refractive index that is equal to core region 14, thus naturally guiding light signal 39 to detector 41. Additionally, light signal 25 represents a remaining fraction or portion of light 17 that is not reflected from mirror 34.

Detector 41 is located with a photosensitive face toward V-groove 28, thereby capturing a maximum amount of light signal 39. Typically, detector 41 is an integral part of a top substrate 42. Substrate 42 is made in several different configurations, such a multi-chip module, printed circuit board, or a silicon wafer.

Figure 3:
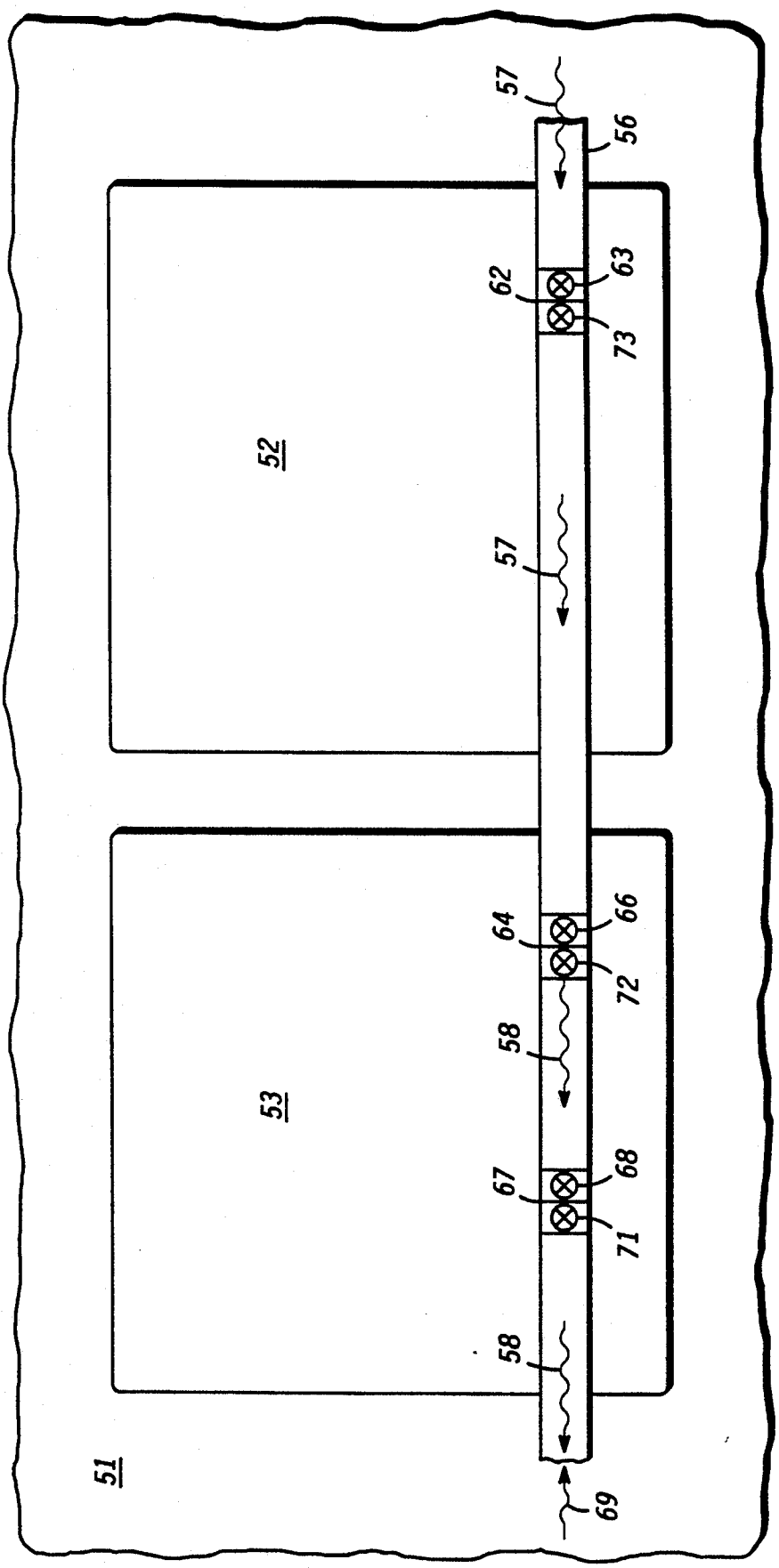
FIG. 3 illustrates a simplified plan view of a substrate having integrated circuits mounted thereon interconnected with an embodiment of the present invention.

FIG. 3 illustrates a simplified partial plan view of a substrate 51, having integrated circuits 52 and 53 mounted thereon interconnected with an embodiment of the present invention. Generally, substrate 51 is made by several different technologies, such as a multi-chip modules, a printed circuit board or a silicon wafer that is fabricated by several well-known methods in the art. However, it should be understood that only a small portion of substrate 51 is illustrated, as well as only two integrated circuits 52 and 53 of a large number of circuits capable of being mounted on substrate 51. Waveguide 56 is formed over integrated circuits 52 and 53, as described in either FIG. 1 or in FIG. 2; however, it should be understood that waveguide 56 is only one waveguide of which there could be be many more.

Arrows 57 represents light propagating or traveling through waveguide 56. Partial collectors 62, 64, and 67 divert a portion of light 57 into photodetectors (not shown) under waveguide 56 located in integrated circuits 52 and 53. Arrow tails 63, 66, and 68 represent light reflected down into photodetectors (not shown) in integrated circuits 52 and 53. It should be understood that light represented by arrow 58 propagates through waveguide 56 to another destination. Additionally, arrow 69 represents a light signal that is propagating through waveguide 56 in an opposite direction of light represented by arrows 57 and 58. Arrow tails 71, 72, and 73 represent light 69 being partially reflected into photodetector under waveguide 56.

By now it should be appreciated that a novel method for making and using a partial collector has been described. The novel partial collector is inexpensive and simple to manufacture. Additionally, the partial collector is selectable so that a predetermined amount of light is directed into a photodetector. Also, the novel partial collector diverts reflected light into a photodetector, an integral part of a substrate or integrated circuit.

We claim:

1. A method for partially collecting light from a waveguide comprising:
   providing a polymer waveguide, through which a light signal moves;
   placing a faceted groove in the polymer waveguide, thereby reflecting a portion of the light that is propagating through the waveguide from at least one facet at an oblique angle from the polymer waveguide; and
   filling the faceted groove with a material that has a different refractive index from the polymer waveguide, thereby controlling an amount of light collected by the faceted groove.

2. The method of claim 1 wherein the filling of the faceted groove is accomplished by selecting one of the following materials polymers, glasses, or silicones.

3. The method of claim 1 further comprising providing a detector into which the reflected light is directed.

4. An optical partial collector for reflecting a portion of a light signal from a waveguide comprising:
   a core having at least one surface;
   a cladding region surrounding the core, thereby producing a waveguide; and
   a V-groove with a first facet and a second facet filled with a material that has a different refractive index from the waveguide which is inset into at least a portion of the cladding region, thereby reflecting a portion of light from the waveguide.

5. The optical partial collector of claim 4 wherein at least one of the facets is adjusted to an angle with a range from 25 to 65 degrees perpendicular to the core.

6. The optical partial collector of claim 5 wherein the angle is substantially adjusted to 45 degrees.

7. A method for varying an amount of light collected from an optical polymer waveguide comprising:
   providing the optical polymer waveguide, through which a light signal is propagating;
   positioning a groove with at least one facet intersects the propagating light signal at a predetermined depth, wherein an amount of the light signal that is reflected off the facet is controlled by the depth of the groove;
   selecting a reflective material to coat the at least one facet, thereby changing the amount of the light signal that is reflected off the at least one facet; and filling the faceted groove with a material that has a different refractive index from the polymer waveguide, thereby controlling an amount of light collected by the faceted groove.

8. The method of claim 7 wherein the selecting of a material is one from the following aluminum, silicon, nitride, silicon organic glass, silicon dioxide, or in combination thereof.

9. An intercommunication pathway for integrated circuits comprising:
a substrate;
a first integrated circuit, wherein a first optical detector is integrated in the first integrated circuit mounted on the substrate;
a second integrated circuit, wherein a second optical detector is integrated in the second integrated circuit mounted on the substrate; and
an optical waveguide interconnecting the first optical detector of the first integrated circuit with the second optical detector of the second integrated circuit, wherein the waveguide uses at least a partial facet to filled with a material that has different refractive index from the waveguide reflect an optical signal into the first and the second detector of the first and second integrated circuits, respectively.

10. The intercommunication pathway of claim 9 wherein the waveguide is made of a polymer material.

11. The intercommunication pathway of claim 9 wherein the material used for filling the partial facet is selected from one of the following materials polymer, glass, or silicones.

* * * * *